(12) United States Patent
Patwardhan

(10) Patent No.: US 9,060,027 B2
(45) Date of Patent: Jun. 16, 2015

(54) ASSIGNING LOCATION IDENTIFIERS TO NODES IN A DISTRIBUTED COMPUTER CLUSTER NETWORK ENVIRONMENT

(71) Applicant: CISCO TECHNOLOGY, INC., San Jose, CA (US)

(72) Inventor: Sourabh Suresh Patwardhan, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 168 days.

(21) Appl. No.: 13/936,060

(22) Filed: Jul. 5, 2013

(65) Prior Publication Data

US 2015/0012625 A1 Jan. 8, 2015

(51) Int. Cl.
*H04L 29/12* (2006.01)
*H04L 12/28* (2006.01)
*H04L 12/66* (2006.01)
*G06F 15/177* (2006.01)

(52) U.S. Cl.
CPC ............. *H04L 61/2015* (2013.01); *H04L 12/28* (2013.01); *H04L 12/66* (2013.01); *G06F 15/177* (2013.01)

(58) Field of Classification Search
CPC ....... G06F 15/177; H04L 12/66; H04L 12/28; H04L 61/2015
USPC ........................... 709/221, 220, 224; 370/352
See application file for complete search history.

(56) References Cited

U.S. PATENT DOCUMENTS

| | | | | |
|---|---|---|---|---|
| 8,054,832 B1* | 11/2011 | Shukla et al. | ................ | 370/389 |
| 8,190,769 B1* | 5/2012 | Shukla et al. | ................ | 709/238 |
| 8,560,660 B2* | 10/2013 | Kalusivalingam et al. | ... | 709/223 |
| 8,560,677 B2* | 10/2013 | VanGilder et al. | ............ | 709/224 |
| 8,798,077 B2* | 8/2014 | Mehra et al. | ................... | 370/400 |
| 8,861,525 B1* | 10/2014 | Durand et al. | ................. | 370/392 |
| 8,897,303 B2* | 11/2014 | Xiong et al. | ................... | 370/392 |
| 8,923,277 B1* | 12/2014 | Shekhar et al. | ............... | 370/352 |
| 8,937,950 B2* | 1/2015 | Dunbar et al. | ................. | 370/392 |
| 2010/0287262 A1* | 11/2010 | Elzur | ............................ | 709/220 |
| 2011/0238816 A1* | 9/2011 | Vohra et al. | .................... | 709/224 |

(Continued)

FOREIGN PATENT DOCUMENTS

WO WO 2006015211 A2 * 2/2006

OTHER PUBLICATIONS

Cheocherngngarn, "Cross-Layer Desing for Energy Efficiency on Data Center Network", 2012.*

(Continued)

*Primary Examiner* — O. C. Vostal
(74) *Attorney, Agent, or Firm* — Patent Capital Group

(57) ABSTRACT

An example method for assigning location identifiers (IDs) to nodes in a distributed computer cluster network environment is provided and includes receiving notification of attachment of a compute node to a Top-of-Rack (ToR) switch in the distributed computer cluster network environment, retrieving compute node information from an inventory database in the ToR switch, calculating a location ID of the compute node as a function of at least a portion of the compute node information, and communicating the location ID from the ToR switch to the compute node. The location ID indicates an Open Systems Interconnection (OSI) model Layer 7 logical group associated with an OSI model Layer 1 physical location of the compute node in the distributed computer cluster network environment.

20 Claims, 5 Drawing Sheets

(56) References Cited

U.S. PATENT DOCUMENTS

| | | | |
|---|---|---|---|
| 2011/0310739 A1* | 12/2011 | Aybay | 370/235 |
| 2011/0317703 A1* | 12/2011 | Dunbar et al. | 370/392 |
| 2012/0008528 A1* | 1/2012 | Dunbar et al. | 370/255 |
| 2012/0014386 A1* | 1/2012 | Xiong et al. | 370/392 |
| 2012/0155453 A1* | 6/2012 | Vohra et al. | 370/352 |
| 2012/0158942 A1* | 6/2012 | Kalusivalingam et al. | 709/224 |
| 2012/0236761 A1* | 9/2012 | Yang et al. | 370/259 |
| 2012/0287931 A1* | 11/2012 | Kidambi et al. | 370/392 |
| 2012/0303767 A1* | 11/2012 | Renzin | 709/220 |
| 2013/0003725 A1* | 1/2013 | Hendel et al. | 370/353 |
| 2013/0088969 A1* | 4/2013 | Mukherjee et al. | 370/236 |
| 2013/0219037 A1* | 8/2013 | Thakkar et al. | 709/223 |
| 2014/0046908 A1* | 2/2014 | Patiejunas et al. | 707/687 |
| 2014/0047261 A1* | 2/2014 | Patiejunas et al. | 713/330 |
| 2014/0188996 A1* | 7/2014 | Lie et al. | 709/204 |
| 2014/0304336 A1* | 10/2014 | Renzin | 709/204 |

OTHER PUBLICATIONS

Farlex, "inventory", TheFreeDictionary online, 2015.*
Kuang, "Rack_aware_HDFS_proposal.pdf", 2006.*
Kuang, "Rack-aware Replica Placement", updated 2013.*
Bakshi, "Considerations for Software Defined Networking (SDN): Approaches and Use Cases", 2013.*
The Apache Software Foundation, "Rack-aware Replica Placement," HDFS proposal, Nov. 17, 2006, 6 pages; https://issues.apache.org/jira/browse/HADOOP-692.

* cited by examiner

US 9,060,027 B2

ASSIGNING LOCATION IDENTIFIERS TO NODES IN A DISTRIBUTED COMPUTER CLUSTER NETWORK ENVIRONMENT

TECHNICAL FIELD

This disclosure relates in general to the field of communications and, more particularly, to assigning location identifiers to nodes in a distributed computer cluster network environment.

BACKGROUND

Data centers are increasingly used by enterprises for collaboration and for storing data and/or resources. A typical data center network contains myriad network elements, including hosts, loadbalancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for assigning location identifiers (IDs) to nodes in a distributed computer cluster network environment is provided and includes receiving notification of attachment of a compute node to a Top-of-Rack (ToR) switch in the distributed computer cluster network environment, retrieving compute node information from an inventory database in the ToR switch, calculating a location ID of the compute node as a function of at least a portion of the compute node information, and communicating the location ID from the ToR switch to the compute node. The location ID indicates an Open Systems Interconnection (OSI) model Layer 7 logical group associated with an OSI model Layer 1 physical location of the compute node in the distributed computer cluster network environment.

Example Embodiments

Figure 1:
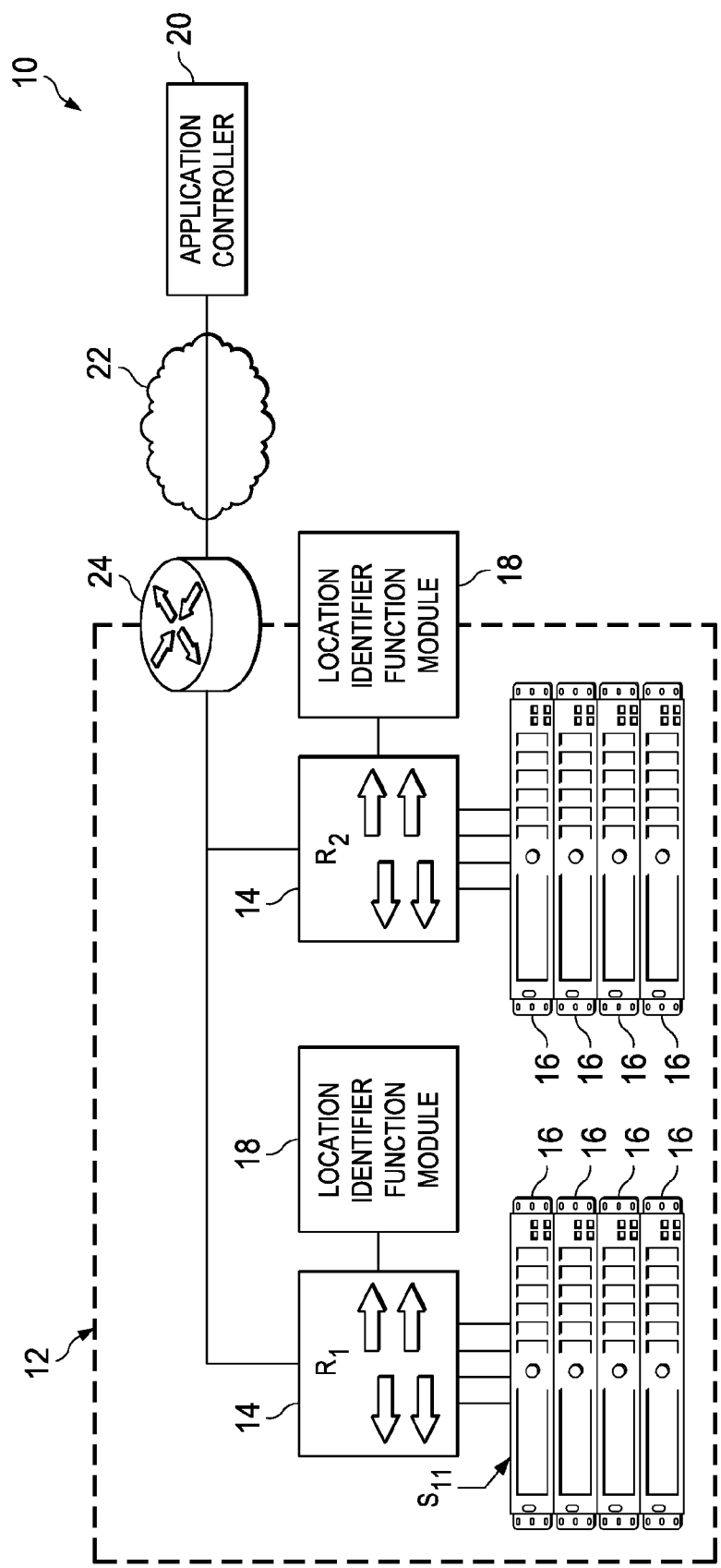
FIG. 1 is a simplified block diagram illustrating a communication system to facilitate assigning location identifiers to nodes in a distributed computer cluster network environment according to an example embodiment.

Turning to FIG. 1, FIG. 1 is a simplified block diagram illustrating an embodiment of communication system 10 for facilitating assigning location identifiers to nodes in a distributed computer cluster network environment. Communication system 10 includes a distributed computer cluster network 12 comprising top-of-rack (ToR) switch(es) 14 connected to compute node(s) 16. A node may be any electronic device, client, server, peer, service, application, or other object capable of sending, receiving, or forwarding information over communications channels in a network. A compute node includes a node that is configured to perform computations (e.g., calculation, analysis, mathematical and logical operations, binary operations, etc.). In some embodiments, the compute nodes may execute on dedicated physical servers (e.g., computers such as rack servers, blade servers, etc.). In other embodiments, the compute nodes may virtually execute through virtual machines on non-dedicated devices (e.g., that can perform non-server related functions). Compute nodes can be identified with names and characterized with Internet Protocol (IP) addresses (among other parameters).

As used herein, the term "computer cluster network" refers to a network comprising a cluster of compute node(s) 16 interconnected in any suitable network topology. In various embodiments, computer cluster network 12 may represent a tree hierarchical network topology, comprising one or more datacenters filled with racks of server(s), with each server including one or more compute node(s) 16, with a plurality of servers in each rack connected to a distinct ToR switch 14. Each compute node 16's position in computer cluster network 12 may be represented by a location identifier (ID), comprising a string (e.g., having any syntax, such as a file name syntax) that can indicate a relative location of compute node 16 in computer cluster network 12.

The location ID indicates an OSI model Layer 7 (e.g., Application Layer) logical group associated with an OSI model Layer 1 physical location of compute node 16 in computer cluster network 12. Layer 7 indicates a communication layer facilitating communication between network processes and applications; the Layer 7 logical group indicates a network grouping that can be interpreted by applications, including application controller 20. On the other hand, the applications, including application controller 20 may not be capable of interpreting Layer 1 information provided by the network. The location ID presents to the applications, including application controller 20, information at Layer 1 (e.g., compute node physical location) through a Layer 7 parameter (e.g., location ID) that can be understood and interpreted by the applications.

According to various embodiments, the location ID may include any suitable indicator. For example, server S11 in rack R1 in datacenter D1 may be represented by a location ID of D1/R1/S11. In another example, the location ID may comprise a rack name and port of compute node 16. In yet another example, the location ID may comprise a rack IP address and port of compute node 16. In yet another example, the location ID may comprise a rack ID and a Media Access Control (MAC) address of compute node 16. Various other parameters that can uniquely identify a specific compute node 16 and its relative location in computer cluster 12 can be included in the location ID. Each ToR switch 14 can include a location ID function module 18 that can assign location IDs to compute node(s) 16.

An application controller 20 (e.g., a centralized program for handling flow of an application, including processes executing the application) may communicate with compute node(s) 16 over another network 22 (e.g., Internet) through a gateway 24. Application controller 20 may cause execution of various application processes on multiple compute node(s) 16 that can span many racks. In various embodiments, execution of the application processes may depend on respective locations of compute node(s) 16 (e.g., respective racks of compute node(s) 16) in distributed computer cluster network 12.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Datacenters often host large clusters of compute nodes that can be configured to execute a specific distributed computing job. For example, Apache Hadoop® is an open-source software framework that supports certain data-intensive distributed applications. Hadoop® facilitates executing applications on large clusters of commodity hardware, such as rack servers of a datacenter. Hadoop® implements a computational paradigm that divides the application into many small fragments of work (e.g., a set of application processes), each of which may be executed or re-executed on any compute node in the computer cluster. In addition, Hadoop® provides a distributed file system that stores data on the compute nodes, providing high aggregate bandwidth across the computer cluster.

Such distributed applications may include rack-aware replica placement that can improve data reliability, availability, and network bandwidth utilization. The compute node determines its location ID at startup time and registers with the application controller, for example, a metadata server outside the computer cluster network. The location ID is used further to determine the distribution of the work among the compute nodes according to known algorithms.

Current mechanisms for generating the location ID include manually running a script that prints a rack ID (e.g., an identifier of a specific rack in the computer cluster network) on a screen. The rack ID can then be used as the location ID, which is manually fed to the compute node when it starts. The rack ID is stored in a suitable data structure (e.g., DatanodeID) and sent to the application controller as part of the registration information of the compute node. Such manual strategy may not scale with large datacenters, and can be error-prone.

Communication system 10 is configured to address these issues (and others) in offering a system and method for assigning location identifiers to nodes in a distributed computer cluster network environment. Embodiments of communication system 10 can receive notification of attachment of compute node 16 to ToR switch 14 in distributed computer cluster network 12, retrieve compute node information from an inventory database in ToR switch 14, calculate a location ID of compute node 16 as a function of at least a portion of the compute node information, and communicate the location ID from ToR switch 14 to compute node 16. "Compute node information" as used herein includes any information related to corresponding compute node 16 that may be relevant in identifying the particular compute node 16 and its relative location within computer cluster network 12.

Assume, merely for example purposes and not as limitations that a specific compute node 16 (e.g., server $S_{11}$) boots up and sends out an Address Resolution Protocol (ARP) or Dynamic Host Configuration Protocol (DHCP) request. The directly attached ToR switch 14 (e.g., $R_1$) may intercept the request, call and execute location ID function module 18, and respond with the location ID of server $S_{11}$. In some embodiments, ToR switch 14 may store server information such as MAC address, Universally Unique Identifier (UUID) etc. in a local database (e.g., inventory database), and such stored information may be presented as input to location ID function module 18 for purposes of generating the location ID. In some embodiments, the switch ID may also be used in deriving the location ID. Virtually any appropriate parameter may be used by location ID function module 18 to generate the location ID of a specific compute node 16.

According to some embodiments, a new DHCP option includes the location ID as part of a DHCP acknowledgement (DHCPACK) message. In general, DHCP automates network-parameter assignment to network devices from one or more DHCP servers. When a DHCP-configured client on compute node 16 $S_{11}$ connects to network 12, the DHCP client sends a broadcast query requesting necessary information to a DHCP server. The DHCP request is typically initiated immediately after booting. Upon receiving the DHCP request, the DHCP server assigns compute node 16 $S_{11}$ an IP address, and other IP configuration parameters and responds with the information in the DHCPACK message. The DHCPACK message includes various DHCP options, which are typically octet strings of variable or fixed length. DHCP options can be configured for specific values and enabled for assignment and distribution to DHCP clients based on various parameters. ToR switch 14 (e.g., $R_1$) may intercept the DHCPACK message from the DHCP server, and rewrite the DHCPACK message with the location ID before forwarding it on to compute node 16 $S_{11}$. A DHCP agent on compute node 16 $S_{11}$ may be modified to accept the new DHCP option and make it available for applications that use the location ID.

Turning to the infrastructure of communication system 10, the network topology can include any number of servers, virtual machines, switches (including distributed virtual switches), routers, and other nodes inter-connected to form a large and complex network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Communication system 10 can include any number of compute nodes, servers, server farms, and ToR switches (and other network elements) within the broad scope of the embodiments.

The network topology illustrated in FIG. 1 is simplified for ease of illustration, and may include any suitable topology, including tree, ring, star, bus, etc. in various embodiments. For example, the network may comprise Transparent Interconnection of Lots of Links (TRILL) network, access/edge/core network, etc. The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In some embodiments, location ID function module 18 can include an application executing on ToR switch 14. In other embodiments, location ID function module 18 can include an application executing on another network element in communication with ToR switch 14. Network elements can include computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. In some embodiments, location ID function module 18 may be implemented in a separate stand-alone box that can be plugged into, or otherwise connected to, ToR switch 14. In some embodiments, location ID function module 18 may be implemented in hardware, in software, or in a combination of hardware and software.

Figure 2:
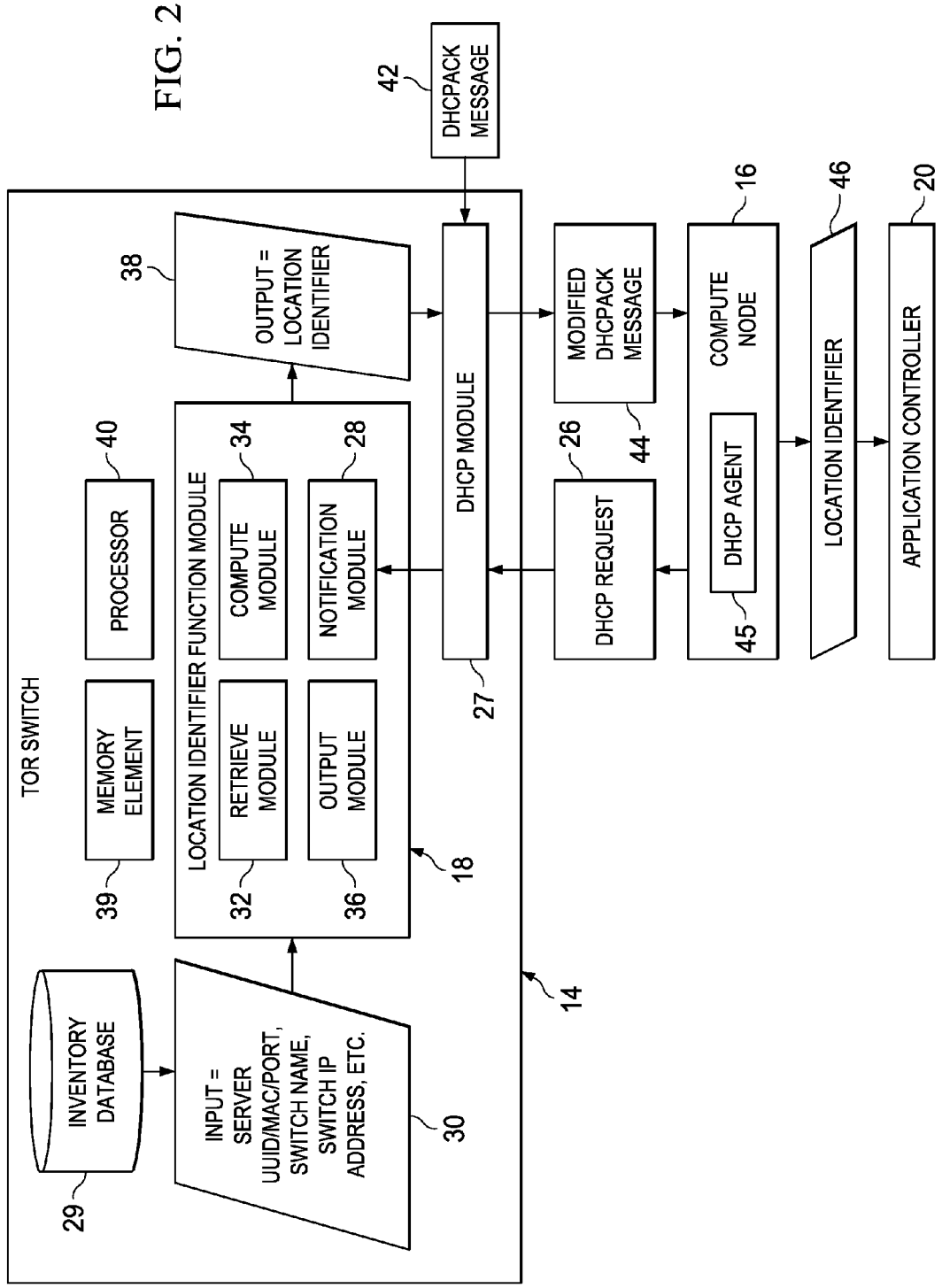
FIG. 2 is a simplified block diagram illustrating example details of the communication system in accordance with one embodiment.

Turning to FIG. 2, FIG. 2 is a simplified block diagram illustrating example details of an embodiment of communication system 10. Example ToR switch 14 may receive a DHCP request 26 from compute node 16. DHCP request 26 may be destined to a DHCP server, within network 12. DHCP module 27 in ToR switch 14 may intercept DHCP request 26, and notify notification module 28 in location ID function module 18. DHCP request 26 may be forwarded on to the DHCP server. Compute node information such as server UUID, MAC address, ToR switch name, ToR switch IP address, etc. may be stored locally in (or accessible by) ToR switch 14 at inventory database 29. At least a portion of the compute node information may be retrieved as input 30 from inventory database 29 by retrieve module 32 of location ID function module 18. Compute module 34 may calculate the location ID based at least on a portion of input 30. For example, the location ID may be determined to be a rack ID of ToR switch 14. Output module 36 in location ID function module 18 may generate an output 48, comprising the location ID (loc ID). Output 38 may be communicated to DHCP module 27. A memory element 39 and a processor 40 in ToR switch 14 may facilitate the operations described herein.

ToR switch 14 may receive a DHCPACK message 42 from the DHCP server, for example, in response to DHCP request from compute node 16. DHCP module 27 may intercept DHCPACK message 42, and modify DHCPACK message 42 to modified DHCPACK message 44 by inserting an option therein comprising the location ID extracted from output 38. DHCP module 27 may communicate modified DHCPACK message 44 to compute node 16. A DHCP agent 45 in compute node 16 may extract location ID 46 from modified DHCPACK message 44 and register (or otherwise communicate) location ID 46 with application controller 20.

Figure 3:
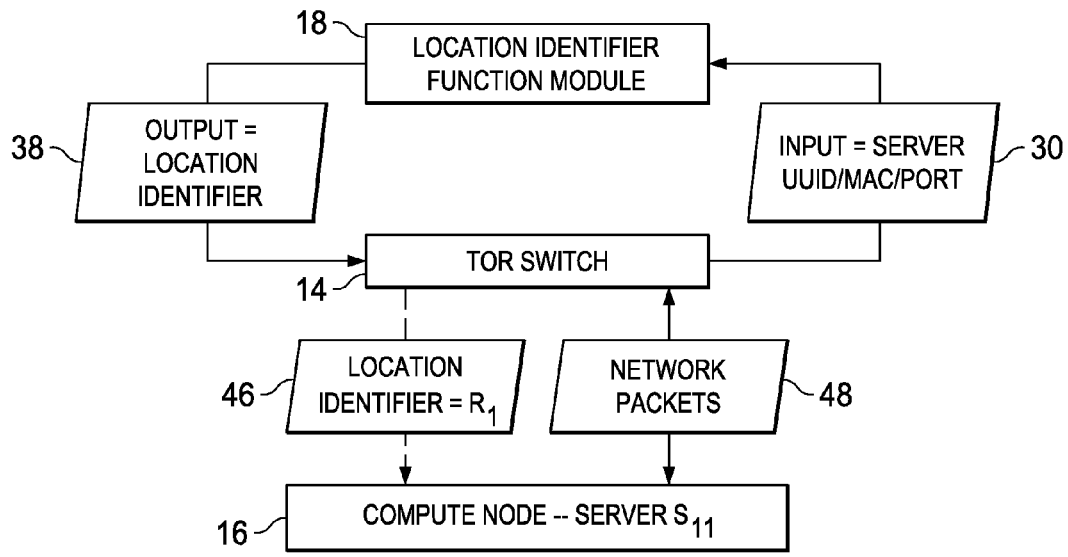
FIG. 3 is a simplified block diagram illustrating other example details of the communication system in accordance with one embodiment.

Turning to FIG. 3, FIG. 3 is a simplified block diagram illustrating example details of an embodiment of communication system 10. According to the example embodiment, compute node 16 may comprise a physical server $S_{11}$. Compute node 16 may exchange network packets 48 with ToR switch 14. Network packets 48 may include DHCP request 26. ToR switch 14 may provide input 30 (e.g., comprising server UUID, MAC address, port, etc.) to location ID function module 18, which may generate output 38 comprising the location ID (e.g., $R_1$) of compute node 16. ToR switch 14 may extract location ID 46 from output 38, and communicate location ID 46 to compute node 16. Although only one server $S_{11}$ is illustrated for simplicity, any number of servers may be attached to ToR switch 14 within the broad scope of the embodiments.

Figure 4:
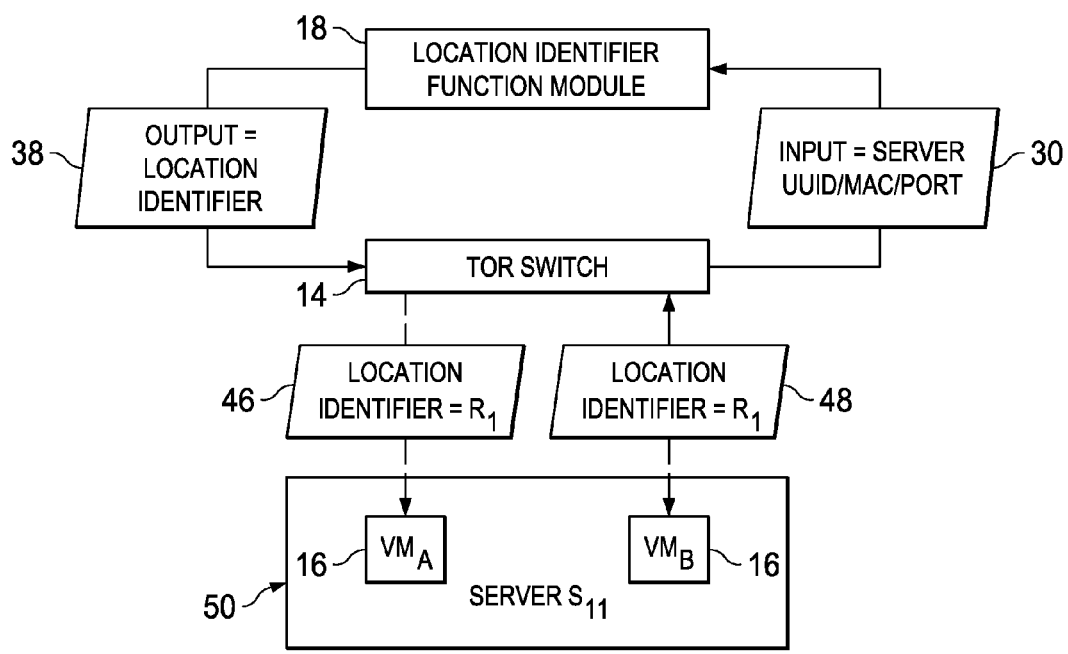
FIG. 4 is a simplified block diagram illustrating yet other example details of the communication system in accordance with one embodiment.

Turning to FIG. 4, FIG. 4 is a simplified block diagram illustrating example details of an embodiment of communication system 10. According to the example embodiment, compute node 16 may comprise virtual machines (e.g., $VM_A$ and $VM_B$) executing on physical server 50 (e.g., $S_{11}$). ToR switch 14 may provide input 30 (e.g., comprising server UUID, MAC address, port, etc.) to location ID function module 18, which may generate output 38 comprising the location ID (e.g., $R_1$) of compute node(s) 16 (e.g., $VM_A$ and $VM_B$). In the illustrated example configuration, because both $VM_A$ and $VM_B$ are attached to the same ToR switch 14, they may share the location ID. ToR switch 14 may extract location ID 46 from output 38, and communicate location ID 46 to compute node(s) 16. Although only two compute nodes are illustrated for simplicity, any number of virtual machines may execute on server $S_{11}$ and any number of servers may be attached to ToR switch 14 within the broad scope of the embodiments.

Figure 5:
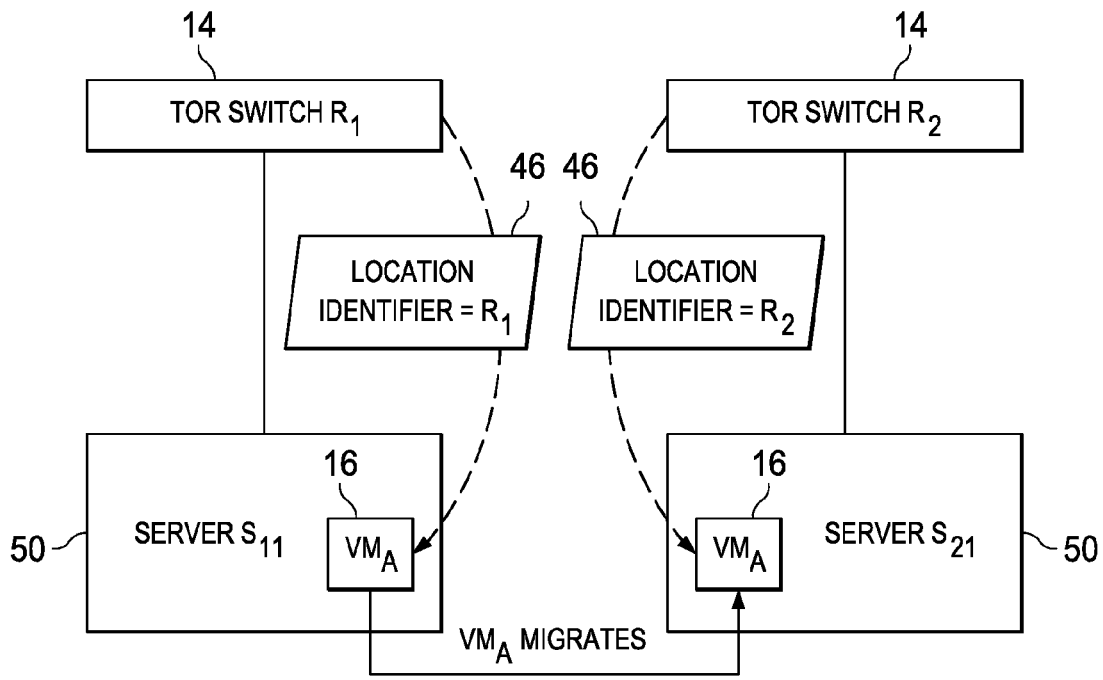
FIG. 5 is a simplified block diagram illustrating yet other example details of the communication system in accordance with one embodiment.

Turning to FIG. 5, FIG. 5 is a simplified block diagram illustrating example details of an embodiment of communication system 10. Assume, merely for example purposes, and not as a limitation, that physical server 50 $S_{11}$ includes compute node 16 $VM_A$ and is attached to ToR switch 14 $R_1$. ToR switch 14 $R_1$ may calculate and communicate location ID 46 (e.g., $R_1$) to compute node 16 $VM_A$. Compute node 16 $VM_A$ may migrate to another physical server $S_{21}$ attached to ToR switch 14 $R_2$. According to some embodiments, the location ID of compute node 16 $VM_A$ may be updated (e.g., to $R_2$) at ToR switch 14 $R_2$. The updated location ID 46 (e.g., $R_2$) may be communicated to compute node 16 $VM_A$ by ToR switch 14 $R_2$.

Figure 6:
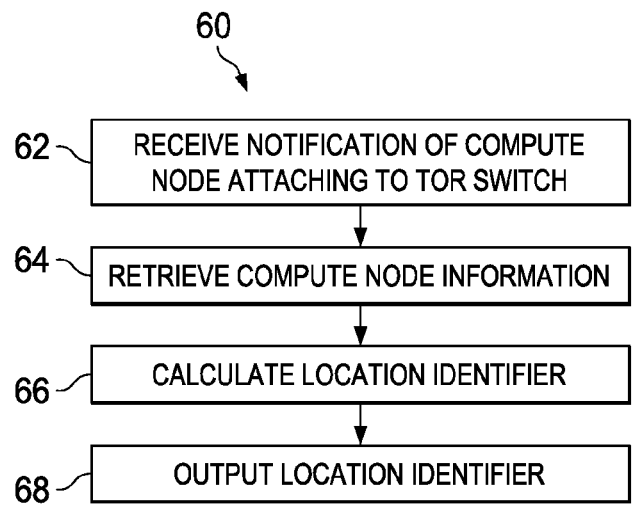
FIG. 6 is a simplified flow diagram illustrating example operations that may be associated with an embodiment of the communication system.

Turning to FIG. 6, FIG. 6 is a simplified flow diagram illustrating example operations 60 that may be associated with location ID function module 18 according to an embodiment of communication system 10. At 62, location ID function module 18 may receive notification of compute node 16 attaching (or being attached, or having attached, etc.) to ToR switch 14. In some embodiments, the notification may be received when a DCHP message is intercepted by ToR switch 14. At 64, location ID function module 18 may retrieve compute node information from inventory database 29. At 66, the location ID may be calculated. In various embodiments, the location ID may be calculated to include a portion of the retrieved compute node information. For example, the location ID may include the rack ID of the rack to which ToR switch 14 and compute node 16 belongs. In another example, the location ID may include a string of parameters, such as the datacenter name, rack ID, and server port. At 68, the calculated location ID may be output to ToR switch 14.

Figure 7:
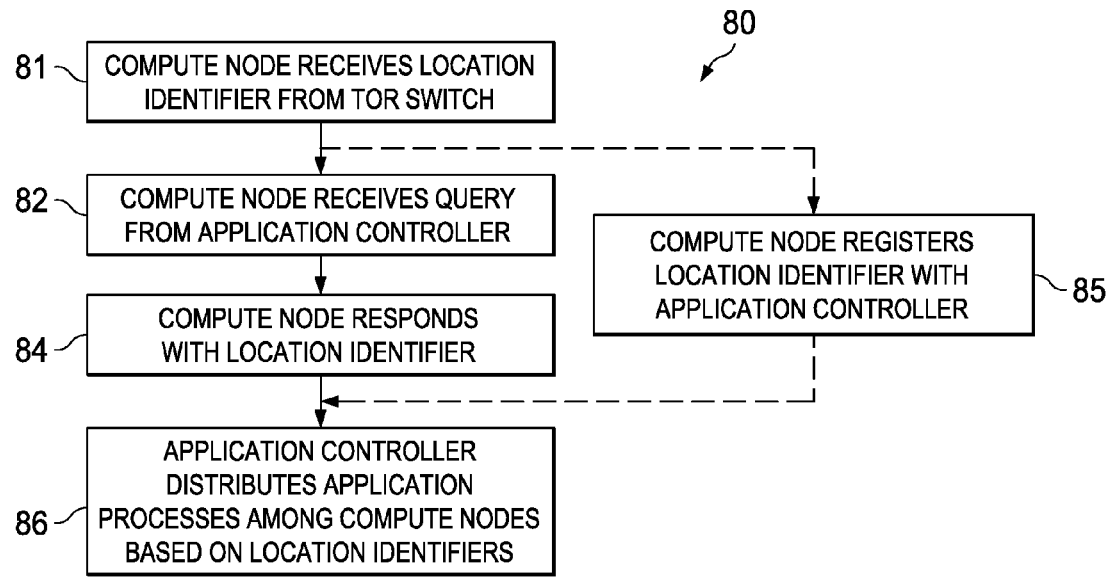
FIG. 7 is a simplified flow diagram illustrating other example operations that may be associated with an embodiment of the communication system.

Turning to FIG. 7, FIG. 7 is a simplified flow diagram illustrating example operations 80 that may be associated with compute node 16 according to an embodiment of communication system 10. At 81, compute node 16 may receive location ID 46 from ToR switch 14. According to some embodiments, at 82, compute node 16 may receive a query from application controller 20 requesting location ID 46. At 84, compute node 16 may respond to application controller 20 with location ID 46. According to other, alternate embodiments, at 85, compute node 16 may register location ID 46 with application controller 20 automatically, for example, without waiting to respond to any query. At 86, application controller 20 may distribute application processes among a plurality of compute nodes 16 based on their respective location IDs.

Figure 8:
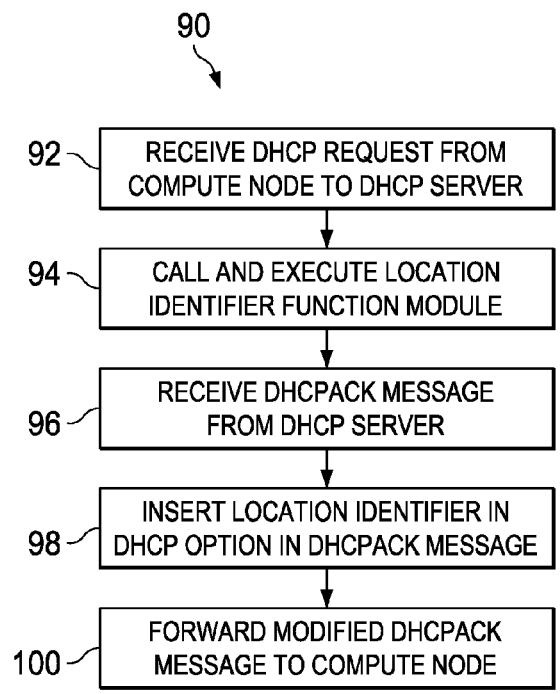
FIG. 8 is a simplified flow diagram illustrating yet other example operations that may be associated with an embodiment of the communication system.

Turning to FIG. 8, FIG. 8 is a simplified flow diagram illustrating example operations 90 that may be associated with ToR switch 14 according to an embodiment of communication system 10. At 92, ToR switch 14 may receive DHCP request 26 from compute node 16, destined to a DHCP server in network 12. At 94, ToR switch 14 may call and execute location ID function module 18 to generate location ID 46. At 96, ToR switch 14 may receive DHCPACK message 42 from the DHCP server. At 98, ToR switch 14 may insert location ID 46 in a suitable DHCP option in DHCPACK message 42 to generate modified DHCPACK message 44. At 100, ToR switch 14 may forward modified DHCPACK message 44 to compute node 16.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of any executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, ToR switch(es) 14. In some embodiments, one or more of these features may be implemented in hardware, provided external to these elements, or consolidated in any appropriate manner to achieve the intended functionality. The various network elements (e.g., servers, switches) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, ToR switch 14 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 39) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 40) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving notification of attachment of a compute node to a Top-of-Rack (ToR) switch in a distributed computer cluster network environment;
   retrieving compute node information from an inventory database in the ToR switch;
   calculating a location identifier (ID) of the compute node as a function of at least a portion of the compute node information, wherein the location ID indicates an Open Systems Interconnection (OSI) model Layer 7 logical group associated with an OSI model Layer 1 physical location of the compute node in the distributed computer cluster network environment; and
   communicating the location ID from the ToR switch to the compute node.

2. The method of claim 1, wherein the compute node moves from the ToR switch to another ToR switch, wherein the location ID is updated at the another ToR switch, wherein the updated location ID is communicated to the compute node by the another ToR switch.

3. The method of claim 1, wherein the compute node information includes at least one selection from a group consisting of server Universally Unique Identifier (UUID), server Media Access Control (MAC) address, a server port on the ToR switch, a ToR switch name, and a ToR switch Internet Protocol (IP) address.

4. The method of claim 1, wherein the notification is received in a Dynamic Host Configuration Protocol (DHCP) request from the compute node to a DHCP server.

5. The method of claim 4, wherein the location ID is communicated from the ToR switch to the compute node through a modified DHCP Acknowledgement (DHCPACK message), wherein the modified DHCPACK message includes an option comprising the location ID.

6. The method of claim 5, wherein the DHCPACK message is received from the DHCP server in response to the DHCP request, wherein the DHCPACK message is modified at the ToR switch.

7. The method of claim 1, wherein the distributed computer cluster network environment includes a plurality of ToR switches, wherein each ToR switch is associated with a unique location ID that is communicated to each compute node attached to the ToR switch.

8. The method of claim 1, wherein a plurality of compute nodes communicates respective location IDs to an application controller, wherein the application controller distributes application processes among the plurality of compute nodes based at least on the respective location IDs.

9. The method of claim 8, wherein the plurality of compute nodes registers the respective locations IDs with the application controller upon receiving the respective location IDs from respective ToR switches to which each compute node in the plurality of servers is connected.

10. The method of claim 8, wherein the plurality of compute nodes communicate the respective location IDs in response to at least one query from the application controller.

11. Non-transitory media encoded in logic that includes instructions for execution and when executed by a processor, is operable to perform operations comprising:
    receiving notification of attachment of a compute node to a ToR switch in a distributed computer cluster network environment;
    retrieving compute node information from an inventory database in the ToR switch;
    calculating a location ID of the compute node as a function of at least a portion of the compute node information, wherein the location ID indicates an OSI model Layer 7 logical group associated with an OSI model Layer 1 physical location of the compute node in the distributed computer cluster network environment; and
    communicating the location ID from the ToR switch to the compute node.

12. The media of claim 11, wherein the compute node information includes at least one selection from a group consisting of server UUID, server MAC address, a server port on the ToR switch, a ToR switch name, and a ToR switch IP address.

13. The media of claim 11, wherein the location ID is communicated from the ToR switch to the compute node through a modified DHCPACK message, wherein the modified DHCPACK message includes an option comprising the location ID.

14. The media of claim 11, wherein the distributed computer cluster network environment includes a plurality of ToR switches, wherein each ToR switch is associated with a unique location ID that is communicated to each compute node attached to the ToR switch.

15. The media of claim 11, wherein a plurality of compute nodes communicates respective location IDs to an application controller, wherein the application controller distributes application processes among the plurality of compute nodes based at least on the respective location IDs.

16. An apparatus, comprising:
a location ID function module;
a memory element for storing data; and
a processor that executes instructions associated with the data, wherein the processor and the memory element cooperate such that the apparatus is configured for:
receiving notification of attachment of a compute node to a ToR switch in a distributed computer cluster network environment;
retrieving compute node information from an inventory database in the ToR switch;
calculating a location ID of the compute node as a function of at least a portion of the compute node information, wherein the location ID indicates an OSI model Layer 7 logical group associated with an OSI model Layer 1 physical location of the compute node in the distributed computer cluster network environment; and
communicating the location ID from the ToR switch to the compute node.

17. The apparatus of claim 16, wherein the compute node information includes at least one selection from a group consisting of server UUID, server MAC address, a server port on the ToR switch, a ToR switch name, and a ToR switch IP address.

18. The apparatus of claim 16, wherein the location ID is communicated from the ToR switch to the compute node through a modified DHCPACK message, wherein the modified DHCPACK message includes an option comprising the location ID.

19. The apparatus of claim 16, wherein the distributed computer cluster network environment includes a plurality of ToR switches, wherein each ToR switch is associated with a unique location ID that is communicated to each compute node attached to the ToR switch.

20. The apparatus of claim 16, wherein a plurality of compute nodes communicates respective location IDs to an application controller, wherein the application controller distributes application processes among the plurality of compute nodes based at least on the respective location IDs.

* * * * *